United States Patent
Lee et al.

(10) Patent No.: US 7,972,015 B2
(45) Date of Patent: Jul. 5, 2011

(54) PROJECTION TYPE IMAGE DISPLAY APPARATUS

(75) Inventors: Jong-soo Lee, Cheonan-si (KR); Kee-uk Jeon, Seoul (KR); Sang-ik Kim, Suwon-si (KR); Jae-geun Lim, Suwon-si (KR); Jung-hyeon Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 472 days.

(21) Appl. No.: 12/128,147

(22) Filed: May 28, 2008

(65) Prior Publication Data

US 2009/0141246 A1    Jun. 4, 2009

(30) Foreign Application Priority Data

Dec. 4, 2007    (KR) .......................... 10-2007-0125126

(51) Int. Cl.
*G03B 21/10*    (2006.01)
*G03B 21/16*    (2006.01)

(52) U.S. Cl. .......................................... 353/77; 353/119

(58) Field of Classification Search .................... 353/37, 353/47, 50, 51, 52, 57, 58, 59, 60, 61, 74, 353/77, 78, 119, 30, 46
See application file for complete search history.

(56) References Cited

U.S. PATENT DOCUMENTS

| | | | |
|---|---|---|---|
| 5,467,154 A * | 11/1995 | Gale et al. ...................... 353/119 |
| 6,231,191 B1 * | 5/2001 | Shiraishi et al. ................ 353/61 |
| 6,273,570 B1 * | 8/2001 | Clifton et al. ................... 353/74 |
| 6,906,758 B2 * | 6/2005 | Park .............................. 348/748 |
| 7,224,526 B2 * | 5/2007 | Putilin et al. .................. 359/462 |
| 7,265,798 B2 * | 9/2007 | Kim ............................... 348/787 |
| 7,360,906 B2 * | 4/2008 | Onishi et al. ................... 353/119 |
| 7,441,903 B2 * | 10/2008 | Kim ............................... 353/61 |
| 7,614,749 B2 * | 11/2009 | Vrachan et al. ................ 353/10 |
| 7,731,369 B2 * | 6/2010 | Cadio et al. ..................... 353/74 |
| 7,789,516 B2 * | 9/2010 | Lee et al. ........................ 353/37 |
| 2004/0004676 A1 * | 1/2004 | Kim ............................... 348/787 |
| 2006/0132728 A1 * | 6/2006 | Kim et al. ...................... 353/119 |
| 2006/0146293 A1 * | 7/2006 | Morimoto et al. .............. 353/61 |
| 2006/0262284 A1 * | 11/2006 | Onishi et al. ................... 353/99 |
| 2006/0290895 A1 * | 12/2006 | Park et al. ....................... 353/61 |
| 2007/0052930 A1 * | 3/2007 | Ki ................................... 353/57 |
| 2009/0141246 A1 * | 6/2009 | Lee et al. ........................ 353/61 |

* cited by examiner

*Primary Examiner* — John R Lee
(74) *Attorney, Agent, or Firm* — Sughrue Mion, PLLC

(57) ABSTRACT

A projection type image display apparatus includes: a cabinet; a screen which is provided in the cabinet; a display device which is placed inside the cabinet and forms an image; and an optical system which projects an image formed by the display device to the screen and comprises at least one mirror, a supporter for supporting the mirror, and a frame through which the supporter is fastened to the cabinet, all of the mirror, the supporter and the frame being disposed within a single interior space formed by the cabinet and the screen.

12 Claims, 3 Drawing Sheets

PROJECTION TYPE IMAGE DISPLAY APPARATUS

CROSS REFERENCE TO RELATED APPLICATIONS

This application claims priority from Korean Patent Application No. 10-2007-0125126, filed on Dec. 4, 2007 in the Korean Intellectual Property Office, the disclosure of which is incorporated herein by reference.

BACKGROUND OF THE INVENTION

1. Field of Invention

Apparatuses and methods consistent with the present invention relate to a projection type image display apparatus employing an optical system provided with a mirror, and more particularly to a projection type image display apparatus having an improved structure capable of keeping performance of an optical system consistent even though surrounding environment changes or use time elapses.

2. Description of the Related Art

In general, a projection type image display apparatus uses light emitted from a light source to focus an image formed by a display device on a screen, thereby displaying the image. To this end, the projection type image display apparatus includes an illumination unit for illumination, the display device for forming an image, and an optical system for projecting an image formed by the display device.

As an example of the optical system, there is a mirror-type optical system including a plurality of mirrors. As compared with a lens-type optical system including a plurality of lenses, the mirror-type optical system has an advantage of little optical aberration, thereby providing an image of high picture quality. However, the mirror-type optical system is more susceptible to changes in the surrounding environment than the lens-type optical system, so that optical performance of the mirror-type optical system may vary largely as the surrounding environment changes.

FIG. 1 is a schematic cross-section view of a conventional projection type image display apparatus employing a mirror-type optical system.

Referring to FIG. 1, the conventional projection type image display apparatus includes a cabinet 1 having an inside space, a screen 3 provided in the front of the cabinet 1, an illumination unit (not shown), a display device 5 to form an image, and an optical system 10 to project an image formed by the display device 5 on the screen 3.

The optical system 10 is placed between the display device 5 and the screen 3, and enlarges and projects an image generated by the display device 5 to the screen 3. For this, the optical system 10 includes a plurality of mirrors M1, M2, M3 and M4, a support structure 11 placed inside the cabinet 1 and supporting each of the mirrors M1, M2, M3 and M4, and a partitioning structure 15 partitioning the inside space of the cabinet 1 into a plurality of spaces.

The partitioning structure 15 prevents air and heat from flowing between the partitioned spaces. Referring to FIG. 1, the partitioning structure 15 partitions the inside space of the cabinet 1 into first through third spaces I, II and III.

In the first space I are provided the illumination unit (not shown); the display device 5; a reflecting surface of the first mirror M1; and the second, third and fourth mirrors M2, M3 and M4 constituting the optical system 10. Further, an inlet 1a for taking in exterior air and an outlet 1b for exhausting interior air are formed in a predetermined region of the cabinet 1 which belongs to the first space I. Also, a fan 7 is provided in the outlet 1b.

In the second space II is provided a rear surface of the first mirror M1. Further, a ventilation hole 1c is formed in a predetermined region of the cabinet 1 which belongs to the second space II, and ventilates the second space II.

The third space III is formed by the partitioning structure 15, a window 20 through which an image reflected from the fourth mirror M4 is transmitted, the cabinet 1, and the screen 3. Also, a reflective mirror 9 is provided in an interior top side of the third space III and reflects light emitted from the optical system 10 to the screen 3.

As described above, since the inside of the cabinet 1 is partitioned into the first through third spaces I, II and III, the first through third spaces I, II and III may have different environments. Thus, the second through fourth mirrors M2, M3 and M4 placed within the first space I are different in thermal expansion from the first mirror M1 having the rear surface which is in the second space II. Consequently, the performance of the optical system deteriorates as surrounding temperature changes or use time elapses.

SUMMARY OF THE INVENTION

Accordingly, it is an aspect of the present invention to provide a projection type image display apparatus having an improved structure capable of keeping performance of an optical system even though the surrounding environment changes or use time elapses.

The foregoing, and other aspects of the present invention, can be achieved by providing a projection type image display apparatus comprising: a cabinet; a screen which is disposed in the cabinet; a display device which is disposed inside the cabinet and forms an image; and an optical system which projects the image formed by the display device to the screen, and comprises at least one mirror, a supporter for supporting the mirror, and a frame through which the supporter is fastened to the cabinet, wherein the mirror, the supporter and the frame are disposed entirely within a single contiguous interior space formed by the cabinet and the screen.

The cabinet of the projection type display apparatus may comprise an inlet and an outlet, and the inlet takes in exterior air and the outlet exhausts interior air.

The projection type image display apparatus may further comprise a fan which is disposed in the single contiguous interior space and creates a current of air between an interior and an exterior of the cabinet.

The at least one mirror may comprise: a substrate; and a reflector formed on the substrate.

The substrate may comprise at least one of plastic, glass and metal materials.

The foregoing, and other aspects of the present invention, can be achieved by providing a projection type image display apparatus comprising: a cabinet; a screen which is disposed in the cabinet; a display device which is disposed inside the cabinet and forms an image; an optical system which projects an image formed by the display device to the screen and comprises at least one mirror, a supporter for supporting the mirror, and a frame through which the supporter is fastened to the cabinet; and a partitioning structure which partitions an interior space formed by the cabinet and the screen into at least two spaces, wherein the mirror, the supporter and the frame are disposed entirely within one of the at least two spaces partitioned by the partitioning structure.

The partitioning structure may comprise: a housing which is disposed in the cabinet and spatially separates the optical system from the screen; and a window which is disposed in the housing and transmits an image projected from the optical system, and the partitioning structure partitions the interior space into a first space in which the optical system is disposed, and a second space which is disposed behind the screen.

The cabinet of the projection type display apparatus may comprise a predetermined region, the predetermined region comprising an inlet which takes in exterior air and an outlet which exhausts interior air, wherein the predetermined region forms the first space.

The projection type image display apparatus may further comprise a fan which is disposed in the first space and creates a current of air between an interior of the first space and an exterior of the cabinet.

The at least one mirror may comprise: a substrate; and a reflector formed on the substrate.

The substrate may comprise at least one of plastic, glass and metal materials.

The foregoing, and other aspects of the present invention, can be achieved by providing an image apparatus comprising a housing comprising a first hole and a second hole, the housing forming a contiguous interior; a display device; and a mirror, wherein the display device and the mirror are disposed in the contiguous interior and the contiguous interior communicates with an exterior through the first and the second holes to cool the contiguous interior.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF THE INVENTION

Figure 1:
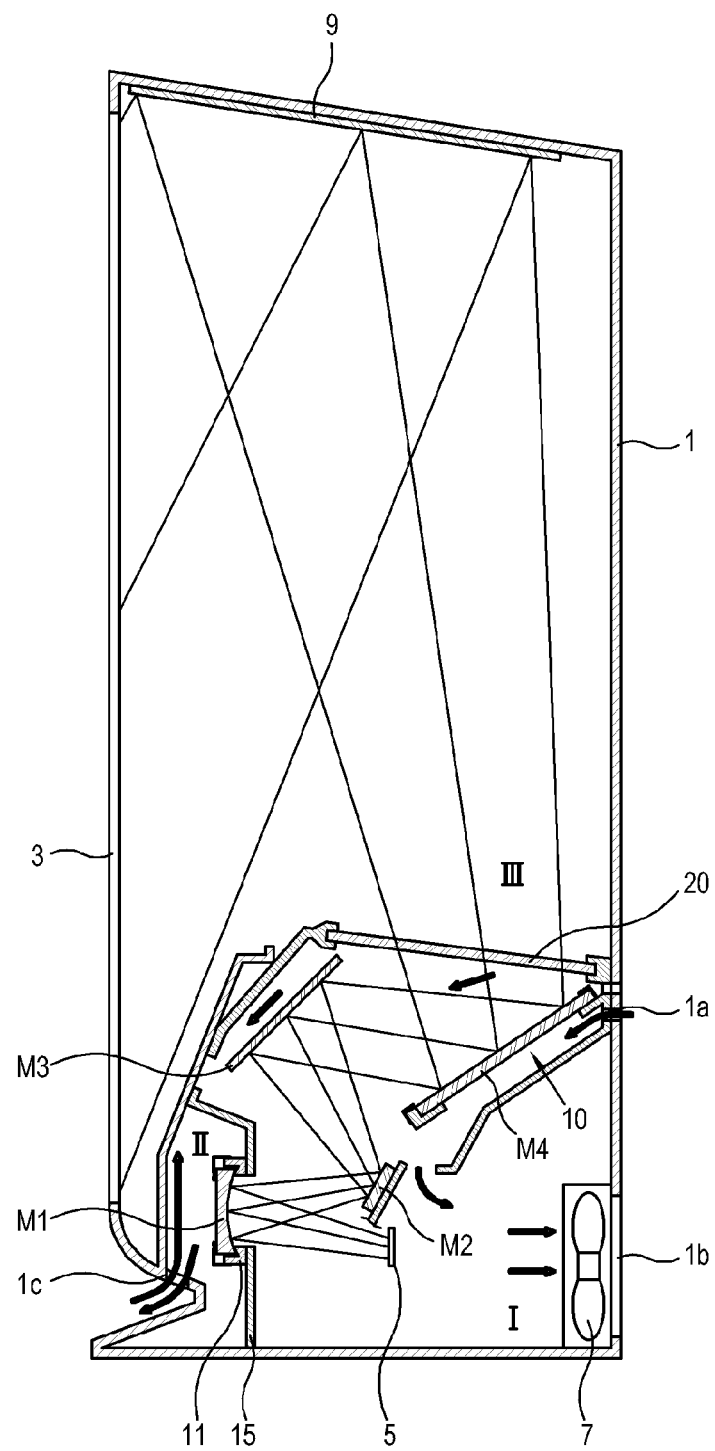
FIG. 1 is a schematic cross-section view of a projection type image display apparatus employing a conventional mirror-type optical system.

Reference will now be made in detail to the embodiments of the present invention, examples of which are illustrated in the accompanying drawings, wherein like reference numerals refer to like elements throughout. The exemplary embodiments are described below so as to explain the present invention by referring to the Figures.

Figure 2:
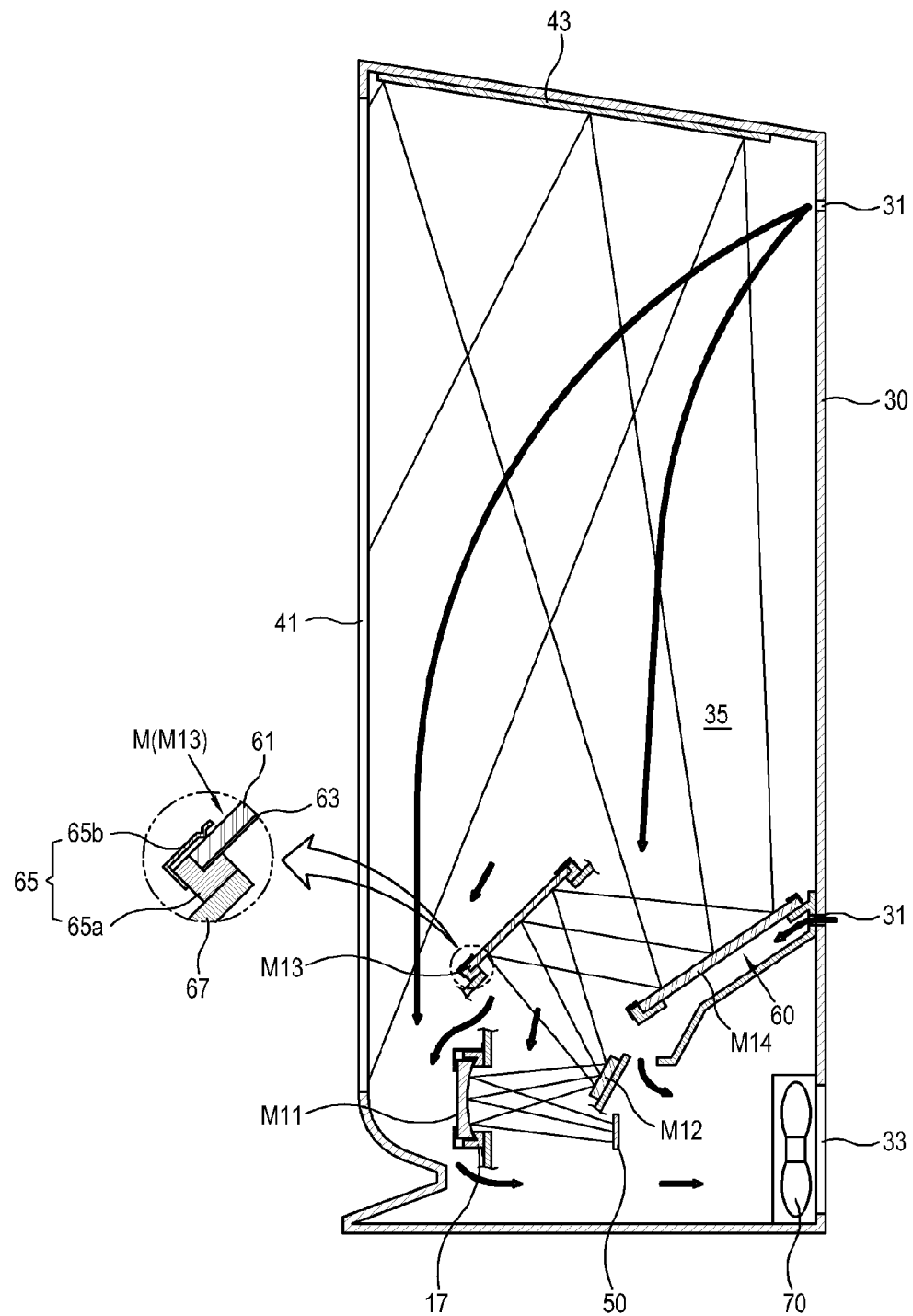
FIG. 2 is a schematic cross-section view of a projection type image display apparatus according to an exemplary embodiment of the present invention.

FIG. 2 is a schematic cross-section view of a projection type image display apparatus according to an exemplary embodiment of the present invention.

Referring to FIG. 2, a projection type image display apparatus according to an exemplary embodiment of the present invention includes a cabinet 30 having an inside space, a screen 41 provided in the cabinet 30, a display device 50 to form an image with light emitted from an illumination unit (not shown), and an optical system 60 to project an image formed by the display device 50 to the screen 41. The optical system 60 is placed in a single interior space 35 formed by the cabinet 30 and the screen 41.

The cabinet 30 forms an outer appearance of the projection type image display apparatus. The cabinet 30 accommodates the display device 50 and the optical system 60 therein, and disposes the screen 41 one side thereof. For example, a rear projection type image display apparatus may be used as the projection type image display apparatus according to an exemplary embodiment of the present invention.

The display device 50 may comprise a liquid crystal display (LCD), a digital micromirror device (DMD), etc., which selectively transmits or reflects light emitted from the illumination unit.

The optical system 60 is placed between the display device 50 and the screen 41, and enlarges and projects an image generated by the display device 50 onto the screen 41. To this end, the optical system 60 includes at least one mirror M, a supporter 65 supporting the mirror M, and a frame 67 through which the supporter 65 is fastened to the cabinet 30. Here, the mirror M, the supporter 65 and the frame 67 are all disposed within the single interior space 35 formed by the cabinet 30 and the screen 41.

As an example of the mirrors constituting the optical system 60, FIG. 2 shows the first through fourth mirrors M11, M12, M13 and M14 which reflect an image formed by the display device 50 in sequence. Thus, the image formed by the display device 50 is enlarged while being reflected from the first through fourth mirrors M11, M12, M13 and M14 in sequence, and finally reflected from a reflective mirror 43 placed in an interior top side of the cabinet 30, thereby being focused on an inside of the screen 41.

Here, each of the first through fourth mirrors M11, M12, M13 and M14 includes a substrate 61 made of a plastic, glass or metal material, and a reflector 63 formed on the substrate 61. Such a material for the substrate 61 may be determined in consideration of the size of the mirror, requested optical performance, production costs, etc. In this embodiment, the glass substrates are used for the first and second mirrors M11 and M12, which are relatively small and disposed close to the display device 50. On the other hand, the plastic substrates are used for the third and fourth mirrors M13 and M14, which are relatively large and disposed distant from the display device 50.

The supporter 65 holds and supports each of the mirrors M, i.e. mirrors M11, M12, M13, and M14, in the frame 67. The supporter 65 includes a supporting plate 65a interposed between the frame 67 and each mirror M, and a pressing plate 65b coupled to the supporting plate 65a and pressing and holding each mirror M.

Meanwhile, an inlet 31 for taking in exterior air and an outlet 33 for exhausting interior air are formed in the cabinet 30 so as to discharge heat generated while the projection type image display apparatus operates. In addition, the projection type image display apparatus may further include a fan 33 provided inside the single interior space 35 and creates a current of air between the interior and the exterior of the cabinet 30. In an exemplary embodiment, the single interior space 35 is contiguous.

As described above, the optical system 60 is provided inside the single interior space 35, so that variables in the surrounding environment, such as temperature or the like, as well as use time of the projection type image display apparatus, can have substantially uniform effects on the whole optical system 60. Therefore, there is little change in the optical performance between the elements constituting the optical system 60, so that the projection type image display apparatus according to this embodiment can have improved optical performance as compared with the conventional projection type image display apparatus shown in FIG. 1.

Figure 3:
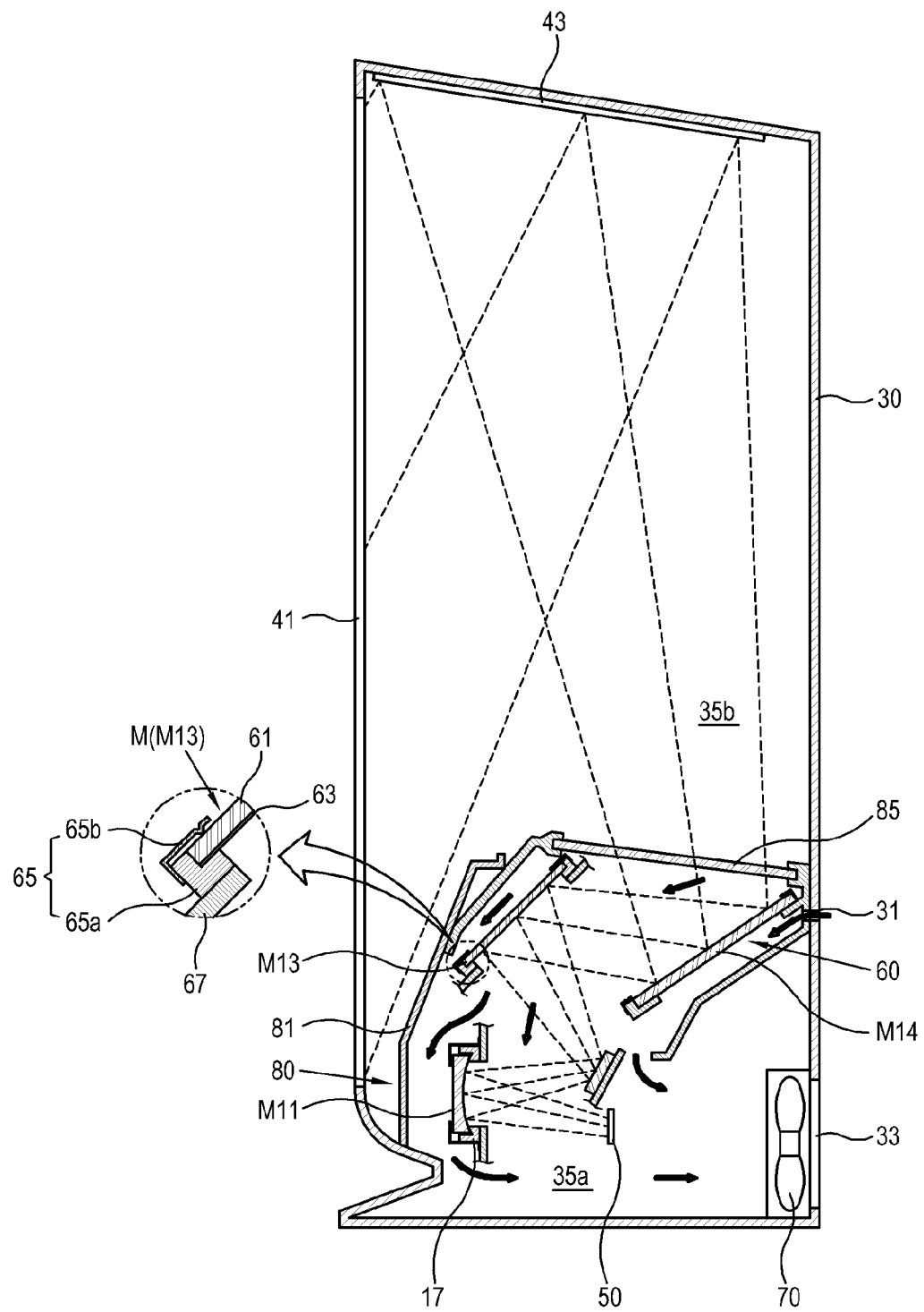
FIG. 3 is a schematic cross-section view of a projection type image display apparatus according to another exemplary embodiment of the present invention.

FIG. 3 is a schematic cross-section view of a projection type image display apparatus according to another exemplary embodiment of the present invention.

Referring to FIG. 3, a projection type image display apparatus according to another exemplary embodiment of the present invention includes a cabinet 30 having an inside space, a screen 41 provided in the cabinet 30, a display device 50 to form an image with light emitted from an illumination unit (not shown), an optical system 60 to project an image formed by the display device 50 to the screen 41, and a partitioning structure 80. The partitioning structure 80 partitions the inside space formed by the cabinet 30 and the screen 41 into at least two spaces.

As compared with the former embodiment, the latter embodiment is characterized in that the partitioning structure 80 is additionally provided and the optical system 60 is disposed in one of the spaces partitioned by the partitioning structure 80.

Hereinafter, like numerals refer to like elements, and repetitive descriptions thereof will be avoided as necessary.

Referring to FIG. 3, the partitioning structure 80 includes a housing 81, and a window 85 provided in the housing 81. The housing 81 is provided within the cabinet 30, and spatially separates the optical system 60 from the screen 41. The window 85 is installed in the housing 81, partitions the inside space of the cabinet 30 along with the housing 81, and transmits the image projected from the optical system 60.

With this partition structure 80, the inside space of the cabinet 30 is partitioned into a first space 35a in which the optical system 60 is provided, and a second space 35b placed behind the screen 41.

Further, an inlet 31 for taking in exterior air and an outlet 33 for exhausting interior air may be provided in a predetermined region of the cabinet 30 forming the first space 35a.

Also, a fan 33 may be provided in the first space 35a to create a current of air between the inside of the first space 35a and the outside of the cabinet 30.

As described above, the whole optical system 60 is provided inside the first space 35a, so that variables in the surrounding environment, such as temperature or the like, as well as use time of the projection type image display apparatus can have substantially uniform effects on the mirrors M constituting the optical system 60, the supporter 65 and the frame 67. In an exemplary embodiment, the first space 35a is contiguous. Therefore, there is little change in the optical performance between the elements constituting the optical system 60, so that the projection type image display apparatus according to this embodiment can have improved optical performance as compared with the conventional projection type image display apparatus shown in FIG. 1.

According to the exemplary embodiments of the present invention, an optical system disposed in a single interior space of a projective image display apparatus, so that surrounding environment such as temperature or the like and use time of the projection type image display apparatus can have substantially uniform effects on the whole optical system. Accordingly, there is little change in optical performance between elements constituting the optical system.

Although exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A projection type image display apparatus comprising:
   a cabinet;
   a screen which is disposed in the cabinet;
   a display device which is disposed inside the cabinet and forms an image; and
   an optical system which projects the image formed by the display device to the screen, and comprises at least one mirror, a supporter for supporting the mirror, and a frame through which the supporter is fastened to the cabinet,
   wherein the mirror, the supporter and the frame are disposed entirely within a single contiguous interior space formed by the cabinet and the screen;
   wherein the supporter comprises:
      a supporting plate disposed between the frame and the mirror; and
      a pressing plate coupled to the supporting plate, which presses and holds the mirror.

2. The projection type image display apparatus according to claim 1, wherein the cabinet comprises an inlet and an outlet, and the inlet takes in exterior air and the outlet exhausts interior air.

3. The projection type image display apparatus according to claim 2, further comprising a fan which is disposed in the single contiguous interior space and creates a current of air between an interior and an exterior of the cabinet.

4. The projection type image display apparatus according to claim 1, wherein the at least one mirror comprises:
   a substrate; and
   a reflector formed on the substrate.

5. The projection type image display apparatus according to claim 4, wherein the substrate comprises at least one of plastic, glass and metal materials.

6. A projection type image display apparatus comprising:
   a cabinet;
   a screen which is disposed in the cabinet;
   a display device which is disposed inside the cabinet and forms an image;
   an optical system which projects an image formed by the display device to the screen and comprises at least one mirror, a supporter for supporting the mirror, and a frame through which the supporter is fastened to the cabinet; and
   a partitioning structure which partitions an interior space formed by the cabinet and the screen into at least two spaces,
   wherein the mirror, the supporter and the frame are disposed entirely within one of the at least two spaces partitioned by the partitioning structure, and the screen is disposed within another of the at least two spaces.

7. The projection type image display apparatus according to claim 6, wherein the partitioning structure comprises:
   a housing which is disposed in the cabinet and spatially separates the optical system from the screen; and
   a window which is disposed in the housing and transmits an image projected from the optical system; and
   the partitioning structure partitions the interior space into a first space in which the optical system is disposed, and a second space which is disposed behind the screen.

8. The projection type image display apparatus according to claim 7, wherein the cabinet comprises a predetermined region, the predetermined region comprising an inlet which takes in exterior air and an outlet which exhausts interior air, wherein the predetermined region forms the first space.

9. The projection type image display apparatus according to claim 8, further comprising a fan which is disposed in the first space and creates a current of air between an interior of the first space and an exterior of the cabinet.

10. The projection type image display apparatus according to claim 6, wherein the at least one mirror comprises:
    a substrate; and
    a reflector formed on the substrate.

11. The projection type image display apparatus according to claim 10, wherein the substrate comprises at least one of plastic, glass and metal materials.

12. An image apparatus comprising:
   a housing comprising a first hole and a second hole, the housing forming a contiguous interior;
   a display device;
   a mirror,
   a supporter which supports the mirror, and
   a frame through which the supporter is fastened to a cabinet;
   wherein the display device and the mirror are disposed in the contiguous interior and the contiguous interior communicates with an exterior through the first and the second holes to cool the contiguous interior; and
   wherein the supporter comprises:
      a supporting plate disposed between the frame and the mirror; and
      a pressing plate coupled to the supporting plate, for pressing and holding the mirror.

* * * * *